(12) United States Patent
Nagasaki et al.

(10) Patent No.: US 12,260,697 B2
(45) Date of Patent: Mar. 25, 2025

(54) CASH HANDLING SYSTEM AND CASH HANDLING METHOD

(71) Applicant: GLORY LTD., Himeji (JP)

(72) Inventors: Toshikazu Nagasaki, Himeji (JP); Ken Matsuhashi, Himeji (JP); Jason Ammar Nader, Himeji (AU)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/237,405

(22) Filed: Aug. 24, 2023

(65) Prior Publication Data
US 2024/0078860 A1    Mar. 7, 2024

(30) Foreign Application Priority Data

Sep. 1, 2022   (JP) ................ 2022-139097

(51) Int. Cl.
*G07D 11/00*    (2019.01)
*G07D 11/22*    (2019.01)

(52) U.S. Cl.
CPC ........... *G07D 11/009* (2013.01); *G07D 11/22* (2019.01)

(58) Field of Classification Search
CPC ...... G07D 11/009; G07D 11/22; G07D 11/24; G07D 11/245; G07D 11/30; G06Q 10/087; G07F 19/203; G07F 19/211; G07F 19/202
See application file for complete search history.

(56) References Cited

U.S. PATENT DOCUMENTS

| | | | |
|---|---|---|---|
| 8,225,988 B1 | 7/2012 | Bohen et al. | |
| 8,479,983 B1 * | 7/2013 | Block | G07G 3/003 |
| | | | 235/379 |
| 9,058,598 B1 * | 6/2015 | Li | G06Q 10/0637 |
| 11,334,893 B1 * | 5/2022 | Mattison, Sr. | G07D 11/32 |
| 11,361,374 B2 * | 6/2022 | Morgan | G07D 11/34 |
| 2007/0187485 A1 * | 8/2007 | Aas | G07D 11/24 |
| | | | 235/379 |

(Continued)

FOREIGN PATENT DOCUMENTS

EP    3 364 377 A1    8/2018
JP    2018-205790 A    12/2018

OTHER PUBLICATIONS

Extended European Search Report issued Nov. 7, 2023 in European Patent Application No. 23189711.7, 7 pages.

*Primary Examiner* — Tuyen K Vo
(74) *Attorney, Agent, or Firm* — XSENSUS LLP

(57) ABSTRACT

In order to facilitate transfer of ownership of a huge amount of cash between a plurality of bases, a cash handling system includes: a cash handling apparatus configured to handle banknotes whose ownership is to be transferred between a first owner and a second owner, and generate cash data including serial numbers of the banknotes and attribute information regarding whereabouts of the banknotes; and a management apparatus configured to obtain the cash data from the cash handling apparatus, perform a process of transferring the ownership of the banknotes from the first owner to the second owner if the attribute information satisfies a condition that allows the second owner to own the banknotes, and perform a process of transferring the ownership of the banknotes from the second owner to the first owner on condition that the attribute information satisfies a condition that allows the first owner to own the banknotes.

14 Claims, 7 Drawing Sheets

(56) References Cited

U.S. PATENT DOCUMENTS

| | | | |
|---|---|---|---|
| 2009/0032580 A1* | 2/2009 | Blachowicz | G06Q 10/0832 |
| | | | 235/379 |
| 2009/0222362 A1 | 9/2009 | Stood et al. | |
| 2010/0211437 A1 | 8/2010 | Schneider et al. | |
| 2010/0306092 A1* | 12/2010 | Wilkes | G06Q 20/40 |
| | | | 705/37 |
| 2016/0098706 A1* | 4/2016 | Ling | G06Q 20/10 |
| | | | 705/41 |
| 2018/0218555 A1 | 8/2018 | Nguyen | |
| 2022/0101311 A1* | 3/2022 | Mehrhoff | G06Q 20/381 |
| 2022/0253837 A1* | 8/2022 | Schneider | G06Q 20/065 |

* cited by examiner

FIG.4

| CURRENCY | DENOMI-NATION | SERIAL NUMBER | RECOGNITION INFORMATION | IMAGE | HANDLING NUMBER | HANDLING DATE AND TIME | POSITIONAL INFORMATION | BRANCH INFOR-MATION | APPARATUS INFOR-MATION | ... |
|---|---|---|---|---|---|---|---|---|---|---|
| JAPAN | 1,000 YEN | 123... | FIT NOTE... | P123... | T123... | 2022... | EAST LONGITUDE 1... | S123... | M123... | ... |
| JAPAN | 1,000 YEN | UNREADABLE | FIT NOTE... | P123... | T123... | 2022... | EAST LONGITUDE 1... | S123... | M123... | ... |
| | | | | | ... | | | | | |

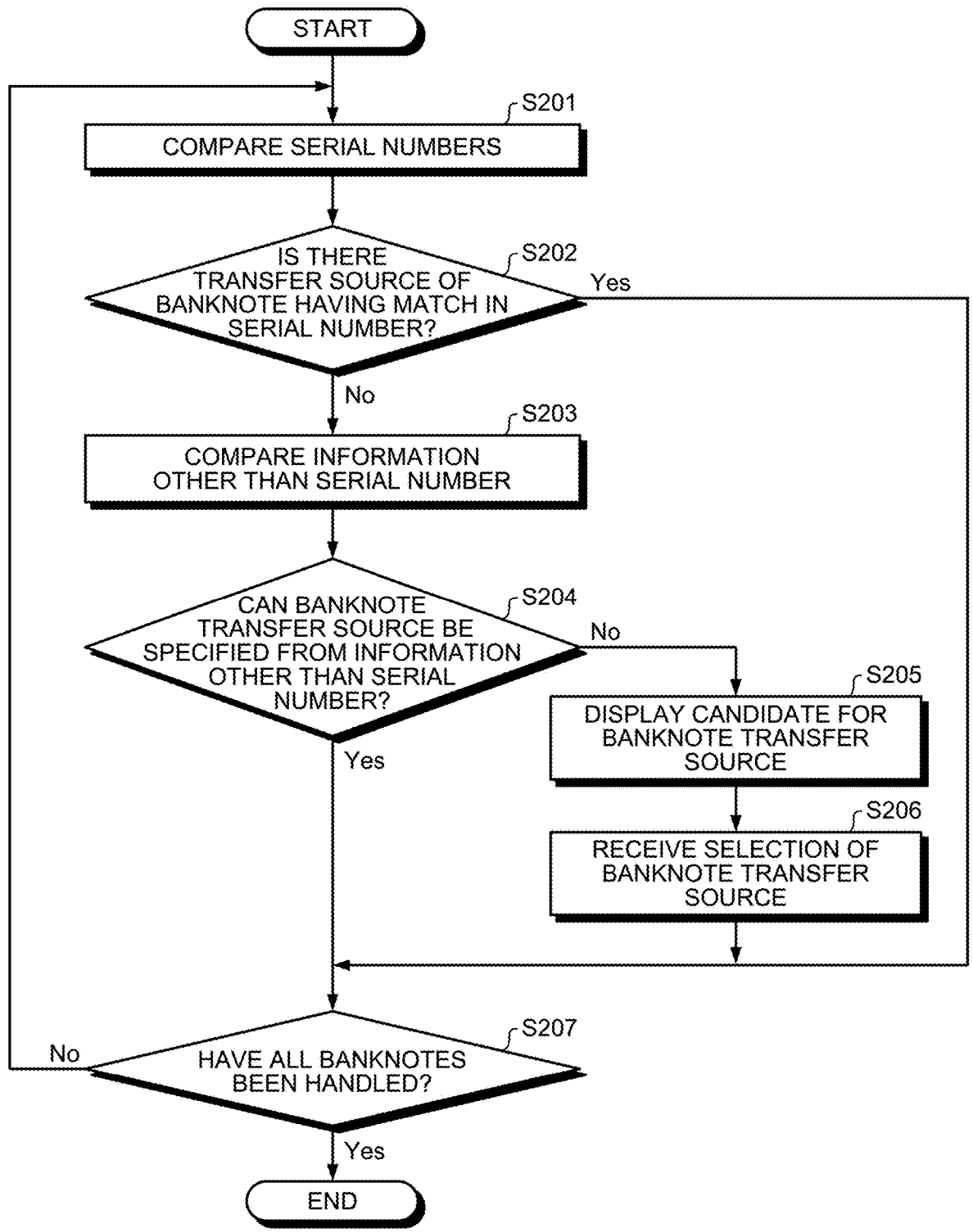

FIG.6

PLEASE SELECT TRANSFER SOURCE

<TRANSFER SOURCE UNKNOWN>
JAPAN 1,000 YEN
SERIAL NUMBER : 12?3···
RECOGNITION RESULT :
 UNFIT NOTE, CREASE ON RIGHT SIDE

<TRANSFER SOURCE A>
JAPAN 1,000 YEN
SERIAL NUMBER : UNKNOWN ☑
RECOGNITION RESULT :
UNFIT NOTE, CREASE ON RIGHT SIDE

<TRANSFER SOURCE B>
JAPAN 1,000 YEN
SERIAL NUMBER : 12??···  ☐
RECOGNITION RESULT :
UNFIT NOTE, CREASE ON RIGHT SIDE

DETERMINATION RESULT OF MATCHING WITH CASH DATA OF TRANSFER SOURCE A

| | CURRENCY | DENOMINATION | SERIAL NUMBER | RECOGNITION INFORMATION | IMAGE | DETERMINATION RESULT |
|---|---|---|---|---|---|---|
| BANKNOTE P | MATCH | MATCH | MATCH | MATCH | MATCH | TRANSFER SOURCE A |
| BANKNOTE Q | MATCH | MATCH | × | MATCH | MATCH | |
| BANKNOTE R | MATCH | MATCH | × | MATCH | × | |
| BANKNOTE S | MATCH | MATCH | × | × | MATCH | |
| BANKNOTE T | MATCH | MATCH | × | × | × | |
| ... | | | | | | |

CASH HANDLING SYSTEM AND CASH HANDLING METHOD

CROSS REFERENCE TO RELATED APPLICATIONS

The present application claims priority to, Japanese patent application JP 2022-139097, filed Sep. 1, 2022, the entire contents of which being incorporated herein by reference.

TECHNICAL FIELD

The present disclosure relates to a cash handling system and a cash handling method used for managing transfer of cash.

BACKGROUND ART

Conventionally, a cash handling system that manages banknotes based on serial numbers of the banknotes has been known. The serial numbers are used as identification numbers for identifying the respective banknotes. For example, Japanese Laid-Open Patent Publication No. 2018-205790 discloses a technology for accumulating, in a host apparatus, data of the serial numbers of banknotes read by a plurality of cash handling apparatuses. By collecting the serial numbers of banknotes handled by cash handling apparatuses in a bank into the host apparatus, all the banknotes handled in the bank can be identified. For example, stolen banknotes can be tracked based on the serial numbers.

Banks include a central bank, and other banks called, for example, commercial banks or city banks. The central bank, which issues banknotes and coins, is used by the commercial banks, and therefore the central bank is sometimes called as the "bank of banks". The commercial banks are used by general customers, and do business by using banknotes and coins (i.e., cash) issued by the central bank. Cash that a commercial bank uses in business includes cash that the commercial bank borrows from the central bank. The commercial bank has to pay interest to the central bank for the borrowed cash. For the purpose of reducing the amount of interest by repaying cash to the central bank, the commercial bank transports cash to the central bank and deposits the cash into the central bank. For example, cash is transported and deposited after business hours of the commercial banks. When transporting a huge amount of cash, the serial numbers of banknotes are read by the cash handling apparatus to make all the banknotes trackable, thereby ensuring security while transporting the cash.

SUMMARY

However, in a situation where a huge amount of cash to be transferred is transported between bases of banks almost every day, concern arises regarding security while transporting cash, as the number of source bases and destination bases increases, or as the distance between these bases increases. An increase in cash transportation cost is also of concern to the banks. Therefore, it is desired that cash is transported as short a distance as possible between a plurality of bases.

The present disclosure is made in view of the above problem of the conventional art. The present disclosure addresses the problem, as discussed herein, with a cash handling system and a cash handling method that can transfer ownership of cash without physically transferring the cash.

A cash handling system according to the present disclosure includes: a cash handling apparatus configured to handle banknotes whose ownership is to be transferred between a first owner and a second owner, and generate cash data including serial numbers of the banknotes and attribute information regarding whereabouts of the banknotes; and a management apparatus configured to obtain the cash data from the cash handling apparatus, and perform a process of transferring the ownership of the banknotes from the first owner to the second owner on condition that the attribute information satisfies a condition that allows the second owner to own the banknotes.

The objects, features, advantages and technical and industrial significance of this disclosure will be better understood by the following description and the accompanying drawings of the disclosure.

BRIEF DESCRIPTION OF THE DRAWINGS

FIG. 4 shows an example of cash data;

FIG. 5 is a flowchart illustrating a process of specifying a cash transfer source by a management apparatus, based on cash data;

FIG. 6 shows an example of a screen displayed when specifying the cash transfer source; and FIG. 7 illustrates settings regarding a method of specifying a cash transfer source by the management apparatus.

DESCRIPTION OF EMBODIMENTS

Figure 1:
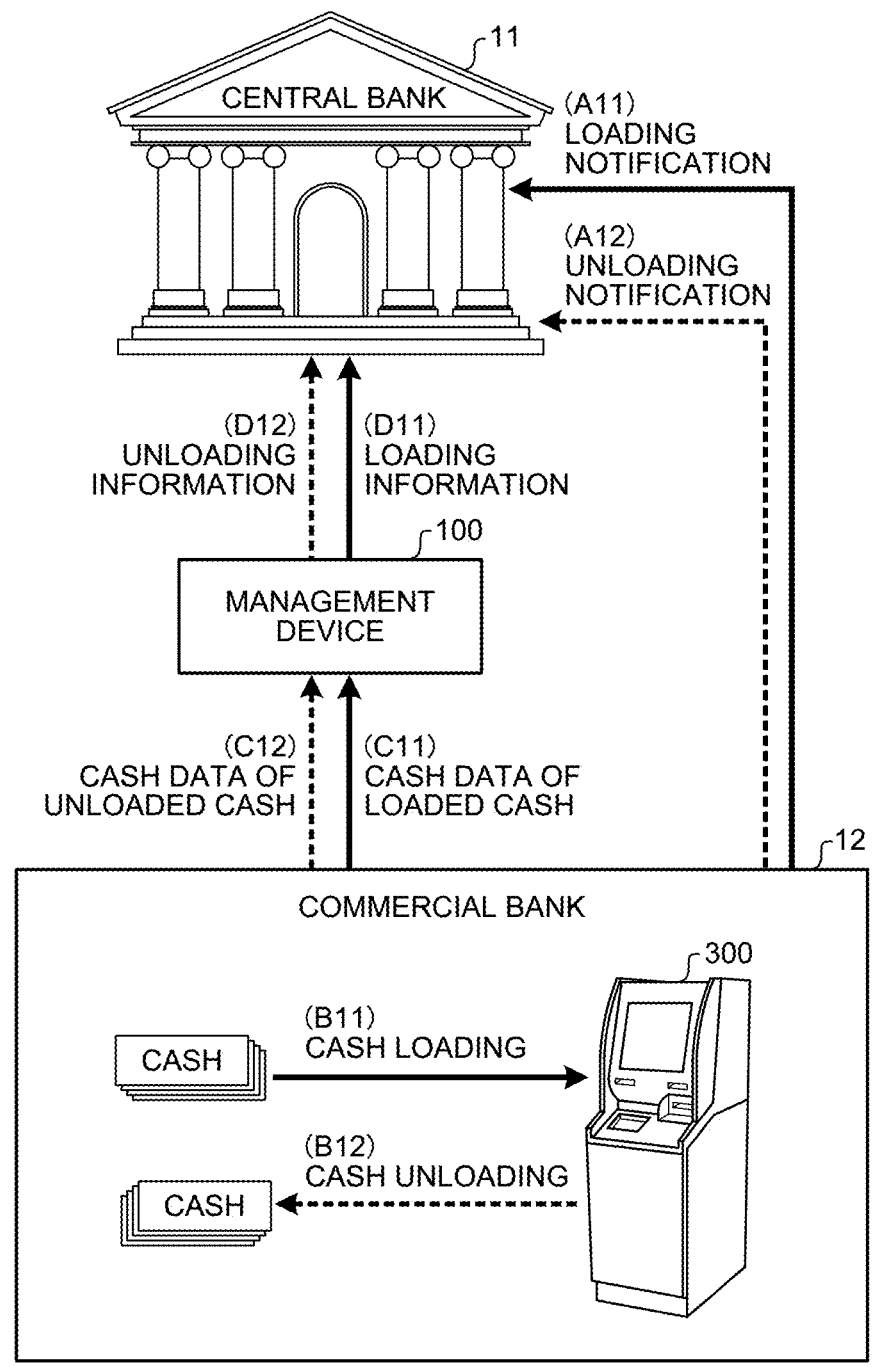
FIG. 1 is a schematic diagram illustrating an example of cash handling performed by using a cash handling system according to an embodiment of the present disclosure.

Hereinafter, an embodiment of a cash handling system and a cash handling method according to the present disclosure will be described with reference to the accompanying drawings. FIG. 1 is a schematic diagram illustrating cash handling performed with the cash handling system according to the present embodiment. The cash handling system performs the cash handling by using identification numbers with which cash can be uniquely identified one by one. The identification numbers may be printed on banknotes, or stored in memory chips embedded in banknotes. If coins have identification numbers, these identification numbers may be used in the cash handling system. Although the kinds of cash and the kinds of identification numbers are not particularly limited, the description will be continued for the case where cash to be transferred is banknotes and the serial numbers of the banknotes are used as identification numbers.

As shown in FIG. 1, a commercial bank 12 notifies a central bank 11 that the commercial bank 12 will load banknotes (A11), and the commercial bank 12 performs loading of banknotes (B11). In the present embodiment, "loading" includes a process for clarifying identification numbers and a location of cash, and a process for transferring an amount of the cash from the commercial bank 12 to the central bank 11. Specifically, banknotes owned by the commercial bank 12 are handled by a cash handling apparatus 300 that is authenticated by the central bank 11 or a cash handling apparatus 300 that is under the management of the central bank 11 to clarify the serial numbers and whereabouts (locations) of the respective banknotes. Then, the amount of the banknotes with the clarified serial numbers and the clarified whereabouts is deposited from the commercial bank 12 to the central bank 11, that is, the ownership of the banknotes is transferred from the commercial bank 12 to the central bank 11. A notification on a loading is exchanged between, for example, a predetermined communication terminal installed in the commercial bank 12 and a predetermined communication terminal installed in the central bank 11, but the exchange of the loading notification may be omitted.

The cash handling apparatus 300 and a management apparatus 100 are managed by the central bank 11 or a management company entrusted by the central bank 11. Therefore, the banknotes handled by the cash handling apparatus 300 are regarded to be under the management of the central bank 11. Alternatively, a cash handling apparatus owned by a commercial bank may be kept under the management of a central bank only for a predetermined period and used as the cash handling apparatus 300.

FIG. 1 shows an example in which the cash handling apparatus 300 is installed in the commercial bank 12. The cash handling apparatus 300 installed in the commercial bank 12 makes it unnecessary to carry out banknotes from the commercial bank 12. However, the place where the cash handling apparatus 300 is installed is not particularly limited. For example, the cash handling apparatus 300 may be installed in a predetermined cash management facility, which is described later in detail with reference to FIG. 2.

The cash handling apparatus 300 handles banknotes to be loaded from the commercial bank 12 into the central bank 11. The handled banknotes are stored inside the cash handling apparatus 300. After the banknote handling, the cash handling apparatus 300 transmits, to the management apparatus 100, cash data in which information on the handled banknotes is registered (C11). The cash data includes: a loading amount of the banknotes to be loaded; and the serial numbers of the respective banknotes. The cash data is obtained by handling the banknotes by the cash handling apparatus 300. The cash data further includes attribute information indicating the whereabouts (location) of the loaded banknotes.

For example, positional information indicating the installation place of the cash handling apparatus 300 is used as the attribute information. For example, apparatus information including ID information of the cash handling apparatus 300 is used as the attribute information. The whereabouts of the banknotes can be clarified based on that the apparatus information of the cash handling apparatus 300 having handled the banknotes to be loaded is that of an apparatus authenticated by, or under the management of, the central bank 11. The cash data including the serial numbers and the attribute information will be described in detail with reference to FIG. 2.

The banknotes loaded from the commercial bank 12 into the central bank 11, i.e., the banknotes handled by the cash handling apparatus 300 and being under the management of the central bank 11, are strictly managed. For example, preferably, the loaded banknotes are managed such that no one can touch them, or managed such that only a person having a predetermined authority can touch them.

For example, if the cash handling apparatus 300 is installed in the commercial bank 12, the cash handling apparatus 300 is installed in a room such as an anti-theft vault room, the door of which is usually locked to prevent people from entering the room. Only a person having a predetermined authority is allowed to unlock the door, enter the room, and perform a loading operation by using the cash handling apparatus 300. Similarly, when the cash handling apparatus 300 is installed in a cash management facility, the place where the cash handling apparatus 300 is installed is subjected to anti-theft measures as described above, and only a person having a predetermined authority is allowed to enter the place. The cash handling apparatus 300 may include a safe unit, and handled banknotes, i.e., loaded banknotes, may be stored in a storage disposed inside the safe unit. However, the loaded banknotes may be managed by another method as long as the banknotes can be strictly managed. For example, the cash handling apparatus 300 installed outside a vault room may handle banknotes to be loaded and store them in a dedicated storage container, and a person in charge having a predetermined authority may carry the storage container in which the loaded banknotes are stored, to the vault room. Approval of the central bank 11 may be required for a dispensing of the banknotes stored in the cash handling apparatus 300, i.e., an unloading of the banknotes. For example, the cash handling apparatus 300 may perform the dispensing process, on the condition that the management apparatus 100 has transmitted, to the cash handling apparatus 300, information indicating that the dispensing has been approved by the central bank 11. After the dispensing process has been performed by the cash handling apparatus 300, history information including information on an operator who has performed the dispensing process, the amount of dispensed banknotes, etc., may be recorded in at least one of the cash handling apparatus 300 and the management apparatus 100.

The management apparatus 100 receives the cash data from the cash handling apparatus 300, and recognizes that the banknotes are deposited in the cash handling apparatus 300, i.e., that the banknotes are placed under the management of the central bank 11, based on the attribute information included in the cash data. After receiving the cash data, the management apparatus 100 transmits loading information to the central bank 11 (D11). The loading information includes: information indicating that the banknotes which have been owned by the commercial bank 12 were loaded and are currently under the management of the central bank 11; and a loaded amount that is the amount of these loaded banknotes.

The central bank 11 receives the loading information, and performs a process regarding the loaded banknotes. For example, a process of transferring the ownership of the loaded banknotes from the commercial bank 12 to the central bank 11 is performed by transferring the loading amount from an account of the commercial bank 12 to an account of the central bank 11. Specifically, a predetermined department of the central bank 11 confirms the pieces of information included in the loading information and approves them to complete loading of the banknotes and then, a credit operation for transferring the loading amount between the accounts is performed.

The management apparatus 100 may transmit, to the central bank 11, loading information including the serial numbers of the loaded banknotes, and the central bank 11 may perform a process of confirming authenticity of the banknotes. For example, if the serial number of a banknote loaded from the commercial bank 12 matches the serial number of a banknote loaded from another commercial bank, the central bank 11 can deal with this matching as an abnormal situation including a possibility that either banknote is a counterfeit note.

The management apparatus 100 may perform the account process of transferring the loading amount from the account of the commercial bank 12 to the account of the central bank 11. In this case, the management apparatus 100 may transmit, to the central bank 11, loading information including a completion report of the account process. For example, the management apparatus 100 installed in the central bank 11 may perform the process of approving the pieces of information included in the cash data and the account process, and notify the predetermined department of the central bank 11 of the results of these processes as the loading information.

The management apparatus 100 may perform the process of confirming authenticity of the banknotes, based on the serial numbers of the banknotes. In this case, when abnormality is detected, the management apparatus 100 may perform the notification process for the abnormality. In order to notify the abnormality, the management apparatus 100 may cause the communication terminal used in the central bank 11 to display information indicating the abnormality, or make a sound.

As described above, in the cash handling system, the cash handling apparatus 300 authenticated by the central bank 11 or the cash handling apparatus 300 under the management of the central bank 11 handles banknotes to be loaded from the commercial bank 12 into the central bank 11, and generates cash data including the serial numbers and the attribute information. In the cash handling system, the process of transferring the ownership of the loaded banknotes from the commercial bank 12 to the central bank 11 is performed on the condition that the serial numbers and whereabouts of the loaded banknotes have been clarified by using the cash handling apparatus 300. The commercial bank 12 can complete the loading operation by handling the banknotes to be loaded in the central bank 11, with the cash handling apparatus 300 installed in the commercial bank 12 or the cash management facility. Therefore, the commercial bank 12 need not transport the banknotes from the commercial bank 12 to the central bank 11.

The commercial bank 12 can also perform unloading of banknotes from the central bank 11, by using the cash handling apparatus 300 in a similar manner as the case of loading. The commercial bank 12 notifies the central bank 11 of the unloading of banknotes (A12). In the present embodiment, "unloading" includes a process for transferring an amount of cash from the central bank 11 to the commercial bank 12, and a process for clarifying identification numbers of the cash. Specifically, a process of dispensing banknotes from the central bank 11 to the commercial bank 12, i.e., a process of transferring the ownership of the banknotes corresponding to the dispensing amount from the central bank 11 to the commercial bank 12, is performed. These banknotes to be transferred between the central bank 11 and the commercial bank 12 are handled by the cash handling apparatus 300 authenticated by the central bank 11 or the cash handling apparatus 300 under the management of the central bank 11, so that the serial numbers of the banknotes whose ownership is transferred are clarified. As in the case of loading, a notification on an unloading may be exchanged between a predetermined communication terminal installed in the commercial bank 12 and a predetermined communication terminal installed in the central bank 11, but the exchange of the unloading notification may be omitted.

The cash handling apparatus 300 authenticated by the central bank 11 or the cash handling apparatus 300 under the management of the central bank 11 performs the dispensing process to discharge the banknotes therefrom, whereby the banknotes are unloaded from the central bank 11 to the commercial bank 12 (B12). The cash handling apparatus 300 transmits, to the management apparatus 100, cash data in which information on the unloaded banknotes is registered (C12)). The cash data includes: an unloading amount of the banknotes to be unloaded; and attribute information indicating the whereabouts of these banknotes at the time of handling. The cash data is obtained by handling the banknotes by the cash handling apparatus 300. The cash data further includes the serial numbers of the unloaded banknotes.

The management apparatus 100 recognizes, based on the cash data, that the banknotes are dispensed from the cash handling apparatus 300, i.e., that the ownership of the banknotes is transferred from the central bank 11 to the commercial bank 12. The management apparatus 100 transmits unloading information to the central bank 11 (D12). After receiving the unloading information, the central bank 11 can perform a process regarding the unloaded banknotes. For example, a process of transferring the ownership of the unloaded banknotes from the central bank 11 to the commercial bank 12 is performed. The account process of transferring the ownership may be performed by the management apparatus 100.

As described above, in the cash handling system, the process of transferring the ownership of banknotes from the central bank 11 to the commercial bank 12 is performed based on that the banknotes are dispensed from the cash handling apparatus 300 authenticated by the central bank 11 or the cash handling apparatus 300 under the management of the central bank 11. The process of transferring the ownership of banknotes is performed when a management condition of the central bank 11 indicating that the banknotes are under the management of the central bank 11 is no longer satisfied. Since the commercial bank 12 can unload the banknotes by using the cash handling apparatus 300 installed in the commercial bank 12 or the cash management facility, the commercial bank 12 need not transport the banknotes from the central bank 11 to the commercial bank 12.

Figure 2:
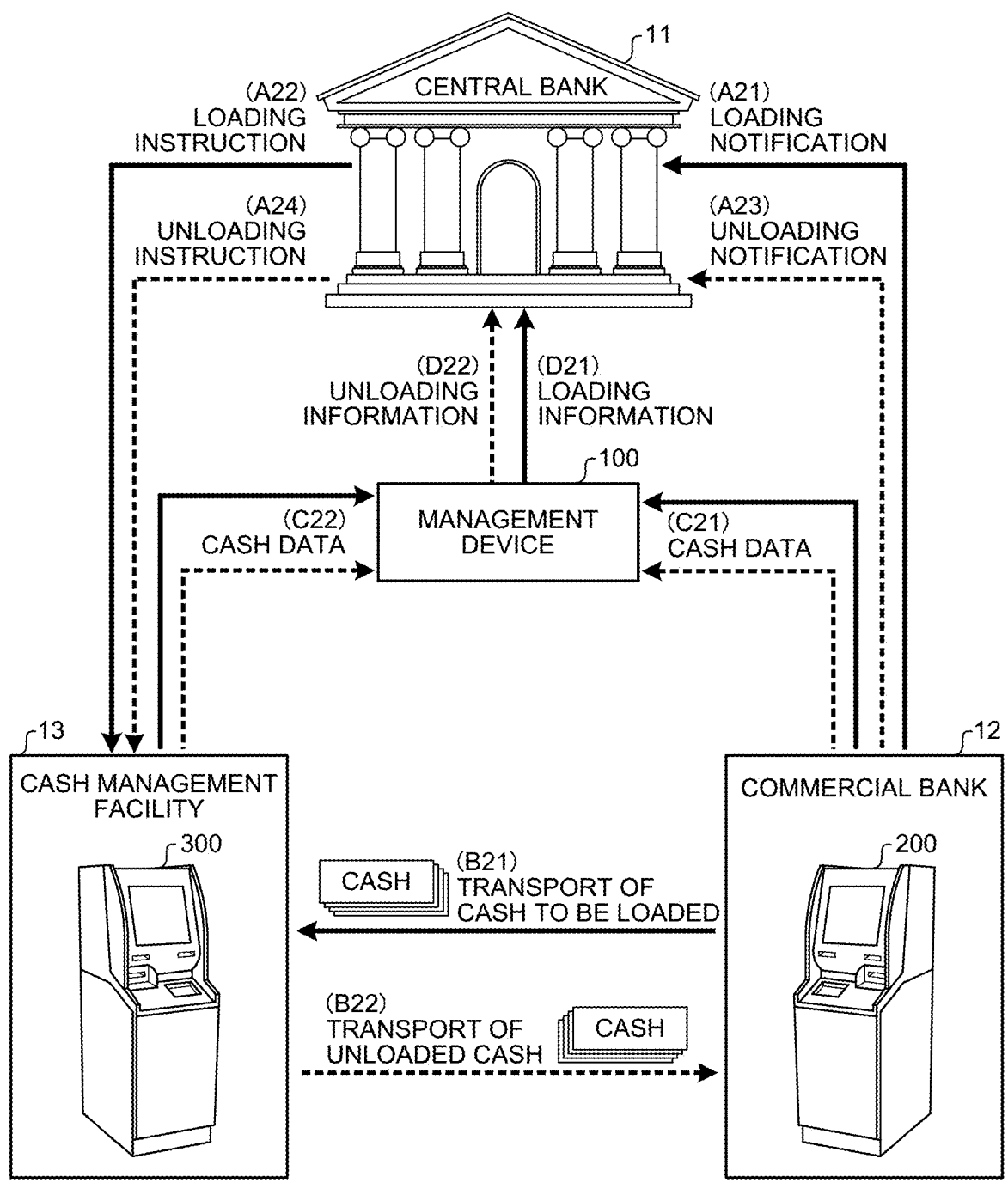
FIG. 2 is a schematic diagram illustrating an outline of cash handling performed in the cash handling system.

Next, an exemplary case where cash owned by the central bank 11 is managed in a place different from the commercial bank 12, will be described. FIG. 2 is a schematic diagram showing an outline of cash handling performed in the cash handling system. The cash management facility 13 shown in FIG. 2 manages cash owned by the central bank 11 by using a cash handling apparatus 300.

At the time of loading, banknotes to be transferred are transported from the commercial bank 12 to the cash management facility 13, and the ownership of the loaded banknotes is transferred from the commercial bank 12 to the central bank 11. At the time of unloading, banknotes to be transferred are transported from the cash management facility 13 to the commercial bank 12, and the ownership of the unloaded banknotes is transferred from the central bank 11 to the commercial bank 12.

As shown in FIG. 2, at the time of loading, the commercial bank 12 notifies the central bank 11 of the loading of banknotes (A21). Upon receiving the notification, the central bank 11 instructs the cash management facility 13 to receive the banknotes transported from the commercial bank 12 (A22). The banknotes to be loaded are transported from the commercial bank 12 to the cash management facility 13 (B21). For example, a cash-in-transit (CIT) company transports the banknotes to be transferred, from the commercial bank 12 to the cash management facility 13. For example, a loading notification is exchanged between a predetermined communication terminal installed in the commercial bank 12 and a predetermined communication terminal installed in the central bank 11, but the exchange of the loading notification may be omitted.

Before transporting the banknotes from the commercial bank 12, these banknotes to be loaded are handled by a cash handling apparatus 200 installed in the commercial bank 12. After the banknotes to be loaded have been transported to the cash management facility 13, these banknotes are handled by a cash handling apparatus 300 installed in the cash management facility 13.

The cash handling apparatus 200 of the commercial bank 12 handles the banknotes to be loaded into the cash management facility 13 to generate cash data. The cash handling apparatus 200 transmits the cash data to the management apparatus 100 (C21). The commercial bank 12 only needs to put the banknotes handled in the cash handling apparatus 200 into a storage container such as a bag, a cassette, etc., and pass the storage container to the CIT company. For example, the commercial bank 12 need not perform an operation of attaching a tag representing the commercial bank 12 to a storage container, and an operation of preparing a storage medium in which information on the commercial bank 12 or banknotes is stored.

The cash handling apparatus 300 of the cash management facility 13 handles the banknotes loaded into the cash management facility 13 from the commercial bank 12 to generate cash data. The cash handling apparatus 300 transmits the cash data to the management apparatus 100 (C22). The cash management facility 13 only needs to take out the banknotes from the storage container received from the CIT company, and handle the banknotes with the cash handling apparatus 300. For example, the cash management facility 13 need not perform an operation of checking a tag attached to a storage container, and an operation of reading information from a storage medium attached to a storage container.

The cash data generated by the cash handling apparatus 200, 300 includes banknote information obtained by handling each banknote in the cash handling apparatus 200, 300. The banknote information includes a currency, a denomination, a serial number, recognition information, and an image of each banknote. However, these pieces of information included in the banknote information are merely examples. Some of the pieces of information may not necessarily be included in the banknote information, or information other than these pieces of information may be included in the banknote information. For example, the banknote information may include date and time when each banknote was handled, the total amount of banknotes, and the like. For example, the banknote information may not necessarily include the recognition information, the image, and the like.

The cash data generated by the cash handling apparatus 200 includes attribute information for specifying the commercial bank 12 that is the installation place of the cash handling apparatus 200. The cash data generated by the cash handling apparatus 300 includes attribute information for specifying the cash management facility 13 that is the installation place of the cash handling apparatus 300. The attribute information includes positional information indicating the installation place of the cash handling apparatus 200, 300. The attribute information may include apparatus information of the cash handling apparatus 200, 300, and information on cash handling performed by the cash handling apparatus 200, 300, which will be described later in detail.

The cash handling apparatus 200, 300 registers, in the cash data, the banknote information of each banknote obtained by handling the banknote to be transferred between the commercial bank 12 and the cash management facility 13. The cash handling apparatus 200, 300 also registers, in the cash data, the attribute information. Thus, cash data, in which data of each banknote including the banknote information and the attribute information is registered, is generated.

The management apparatus 100 compares the cash data obtained from the cash handling apparatus 200 in the commercial bank 12 with the cash data obtained from the cash handling apparatus 300 in the cash management facility 13, thereby confirming that the banknotes are loaded from the commercial bank 12 into the cash management facility 13.

Specifically, upon receiving the cash data generated in the cash handling apparatus 300, the management apparatus 100 searches the serial number of a banknote included in the cash data received from the cash handling apparatus 300, from among the serial numbers included in other cash data already received from. For example, the management apparatus 100 searches the serial number from the cash data received within a predetermined period before the time point when the cash data including the search target serial number was received from the cash handling apparatus 300. The management apparatus 100 may search the serial number only from the cash data received from the commercial bank 12.

If the serial number is found in the cash data generated in the cash handling apparatus 200, the management apparatus 100 refers to user data in which information on users of the cash handling system 1 is registered, and specifies the transfer source and the transfer destination of the banknote. In the user data, account information is registered in association with the attribute information, and an account process of transferring the amount of banknotes from the specified transfer source to the specified transfer destination is performed based on the account information, which will be described later.

The user data is prepared in the management apparatus 100 in advance. In the user data, each attribute information to be registered in the cash data, information indicating the installation place of the cash handling apparatus 200, 300 specified based on the attribute information, and information required for the process to be performed by the management apparatus 100 with respect to banknotes in each installation place, are registered in association with each other.

The management apparatus 100 can specify the cash management facility 13 as the transfer destination of banknotes by referring to the user data, based on the attribute information included in the cash data generated by the cash handling apparatus 300. Likewise, the management apparatus 100 can specify the commercial bank 12 as the transfer source of the banknotes, based on the attribute information in the cash data generated by the cash handling apparatus 200 and the user data.

The management apparatus 100 may have a data sheet (data group) that associates the attribute information of the cash handling apparatus 300 with a specific bank branch (store). The attribute information may be positional information of the cash handling apparatus 300, or apparatus information that is ID information of the cash handling apparatus 300. In addition to the above data sheet, the management apparatus 100 may have a data sheet that associates the attribute information with a specific commercial bank 12. With reference to the data sheet, the management apparatus 100 may transfer the amount of banknotes to the account of the specific commercial bank 12, based on the attribute information transmitted from each cash handling apparatus 300.

The management apparatus 100 has one feature that it can use information other than the serial numbers, for the process of determining matching between the banknote data registered in the cash data of the cash handling apparatus 300 and the banknote data registered in the other cash data.

There may be a situation that the cash handling apparatus 200, 300 cannot read a part or entire of the serial number. In such a case, a serial number that matches a serial number obtained in the cash handling apparatus 300 as the transfer destination cannot be found in the cash data generated in the cash handling apparatus 200 as the transfer source. Even in this case, the management apparatus 100 can specify that a banknote handled in the cash handling apparatus 300 is identical to a banknote handled in the cash handling apparatus 200 by using the banknote information other than the serial number included in the cash data.

For example, the management apparatus 100 can specify that a banknote handled in the cash handling apparatus 300 is identical to a banknote handled in the cash handling apparatus 200 by comparing the images of the banknote. For another example, the management apparatus 100 can specify that a banknote handled in the cash handling apparatus 300 is identical to a banknote handled in the cash handling apparatus 200 by comparing the recognition information of the banknotes. That is, the management apparatus 100 can confirm matching between a banknote whose information is registered in the cash data of the transfer source and a banknote whose information is registered in the cash data of the transfer destination, based on at least one of the recognition information and the image of the banknote. The method of specifying the transfer source and the transfer destination by using the cash data will be described later in detail.

As shown in FIG. 2, the management apparatus 100, which has confirmed the loading of the banknotes from the commercial bank 12 to the cash management facility 13, transmits loading information to the central bank 11 (D21). The loading information includes: information indicating that banknotes have been loaded from the commercial bank 12 into the cash management facility 13; and a loading amount obtained by counting the banknotes by the cash handling apparatus 200, 300. Upon receiving the loading information from the management apparatus 100, the central bank 11 can perform a process regarding the banknotes loaded into the cash management facility 13. For example, a process of transferring the ownership of the loaded banknotes from the commercial bank 12 to the central bank 11 is performed. Specifically, the predetermined department of the central bank 11 confirms and approves the pieces of information included in the loading information to complete loading of the banknotes and then, a credit operation for transferring the loading amount between the accounts is performed.

The management apparatus 100 may perform a process regarding the banknotes loaded from the commercial bank 12 into the cash management facility 13. For example, in the user data, information on the accounts is registered in association with the attribute information in advance, so that the management apparatus 100 can perform an account process of transferring the loading amount from the account of the commercial bank 12 to the account of the central bank 11. After the account process, the management apparatus 100 may transmit, to the central bank 11, loading information including a completion report of the account process.

Although one commercial bank 12 is shown in FIG. 2, in actuality, many commercial banks 12 load banknotes into the central bank 11. The cash management facility 13 may be installed in any place as long as the cash handling apparatus 300 capable of handling banknotes can be installed in the facility and the handled banknotes can be stored and managed inside the facility. Therefore, if a plurality of cash management facilities 13 are appropriately placed taking into consideration the locations of the commercial banks 12, security regarding the transport of banknotes can be enhanced while avoiding long-distance transport of banknotes carried out from each commercial bank 12.

Although the cash management facility 13 is shown separately from the commercial bank 12 in FIG. 2, the cash handling apparatus 300 may be installed inside the commercial bank 12 with the cash handling apparatus 200. If the aforementioned loading operation is performed with the cash handling apparatus 300 installed inside the commercial bank 12 being regarded as the cash management facility 13, banknotes need not be carried out from the commercial bank 12, thereby further enhancing the security regarding the banknotes.

As described above, in the cash handling system 1, the cash data including the serial numbers and the attribute information of the banknotes handled by the cash handling apparatuses 200, 300 are transmitted to the management apparatus 100. The management apparatus 100 compares the information included in the cash data to specify the transfer source and the transfer destination of the banknotes, and performs the process of transferring the ownership of the transferred banknotes from the transfer source to the transfer destination. By only loading the banknotes handled in the cash handling apparatus 200 of the commercial bank 12 into the cash management facility 13 and then handling the loaded banknotes in the cash handling apparatus 300 of the cash management facility 13, the ownership of the loaded banknotes can be transferred from the commercial bank 12 to the central bank 11. This facilitates transfer of the ownership of the banknotes between the commercial bank 12 and the central bank 11.

Unloading of banknotes, in which the commercial bank 12 dispenses the banknotes from the central bank 11, is performed in a similar manner as the case of loading. As shown in FIG. 2, at the time of unloading, the commercial bank 12 notifies the central bank 11 of unloading of banknotes (A23). Upon receiving the notification, the central bank 11 instructs the cash management facility 13 to perform unloading of banknotes to be passed to the commercial bank 12 (A24). Specifically, the predetermined department of the central bank 11 confirms and approves the pieces of information included in the unloading notification to instruct unloading, and banknotes are dispensed from the cash handling apparatus 300. The unloaded banknotes are transported from the cash management facility 13 to the commercial bank 12 (B22). The unloading notification is exchanged between a predetermined communication terminal installed in the commercial bank 12 and a predetermined communication terminal installed in the central bank 11, but the exchange of the unloading notification may be omitted.

The cash handling apparatus 300 in the cash management facility 13 handles the banknotes to be unloaded toward the commercial bank 12 to generate cash data, and transmits the cash data to the management apparatus 100 (C22). The cash handling apparatus 200 in the commercial bank 12 handles the banknotes unloaded and transported from the cash management facility 13 to generate cash data, and transmits the cash data to the management apparatus 100 (C21).

The management apparatus 100 confirms transfer of the banknotes from the cash management facility 13 to the commercial bank 12 based on the cash data generated in the cash handling apparatus 200 and the cash data generated in the cash handling apparatus 300. The management apparatus 100 transmits unloading information to the central bank 11 (D22). The central bank 11 can perform post-processing regarding the unloading, based on the unloading information. For example, a process of transferring the ownership of the unloaded banknotes from the central bank 11 to the commercial bank 12 is performed by transferring an unloading amount from the account of the central bank 11 to the account of the commercial bank 12. Specifically, the predetermined department of the central bank 11 confirms the pieces of information included in the unloading information and approves them to complete the unloading and then, an account process of transferring the unloading amount between the accounts is performed. The management apparatus 100 may perform the account process of transferring the unloading amount from the account of the central bank 11 to the account of the commercial bank 12, and may transmit the unloading information including the result of the account process to the central bank 11.

As described above, in the case where banknotes are transferred from the cash management facility 13 to the commercial bank 12, by only handling the banknotes to be transferred, by using the cash handling apparatuses 200, 300, the management apparatus 100 recognizes the transfer of the banknotes, and performs the process of transferring the ownership of the banknotes from the central bank 11 to the commercial bank 12. This facilitates transfer of the ownership of the banknotes between the central bank 11 and the commercial bank 12. Moreover, when the cash management facility 13 is located near the commercial bank 12 or the cash handling apparatus 300 installed inside the commercial bank 12 is used as the cash management facility 13, the banknote transport distance can be reduced, thereby ensuring the security regarding transportation of banknotes.

Figure 3:
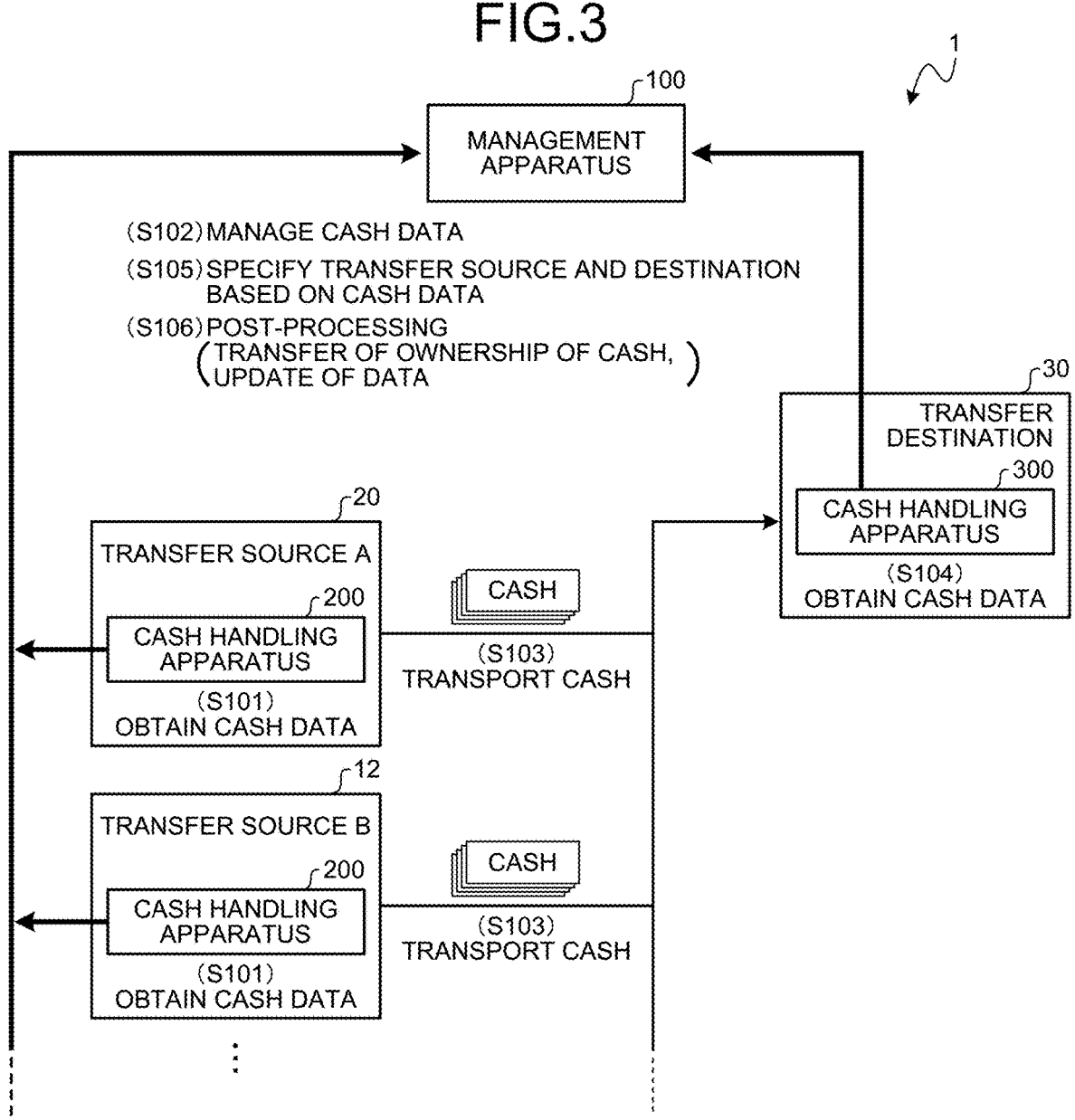
FIG. 3 illustrates an example of a configuration of the cash handling system.

Next, the configuration and operation of the cash handling system 1 for realizing the above-described transfer of banknotes will be described. FIG. 3 illustrates an example of the configuration of the cash handling system 1. The cash handling system 1 includes a management apparatus 100, a cash handling apparatus 200 installed in a banknote transfer source 20, and a cash handling apparatus 300 installed in a banknote transfer destination 30. The management apparatus 100 and the cash handling apparatus 200 are communicably connected to each other wirelessly or via wires. The management apparatus 100 and the cash handling apparatus 300 are also communicably connected to each other wirelessly or via wires.

The transfer source 20 and the transfer destination 30 are a transfer source and a transfer destination of the ownership of banknotes, respectively. That is, the "transfer" is not limited to the case where actual banknotes are transported between the transfer source 20 and the transfer destination 30. For example, there is a case where the cash handling apparatus 300 is installed in the commercial bank 12 and only transfer of the ownership of banknotes is performed while transport of actual banknotes, i.e., physical transfer of banknotes, is not performed, as described above.

Although two transfer sources 20, 12 and one transfer destination 30 are shown in FIG. 3, the numbers of transfer sources 20 and the number of transfer destinations 30 are not particularly limited. The cash handling system 1 may include a plurality of bases serving as banknote transfer destinations 30, and banknotes may be transferred from one or a plurality of bases serving as banknote transfer sources 20 to the respective transfer destinations 30. A plurality of cash handling apparatuses 200 may be installed in one transfer source 20, and a plurality of cash handling apparatuses 300 may be installed in one transfer destination 30. In either case, the cash handling apparatus 200 in the transfer source 20 and the cash handling apparatus 300 in the transfer destination 30 perform similar processes, and therefore, the description will be continued for the configuration shown in FIG. 3. In the example described with reference to FIG. 2, the commercial bank 12 serves as the transfer source 20 and the cash management facility 13 serves as the transfer destination 30 at the time of loading, while the cash management facility 13 serves as the transfer source 20 and the commercial bank 12 serves as the transfer destination 30 at the time of unloading, thereby performing processes described below.

The management apparatus 100 may be a computer device including a controller and a memory. The management apparatus 100 may be a management server. The management apparatus 100 may be operated through an operation unit and a display unit disposed therein, or may be operated with an operation terminal communicably connected thereto.

The cash handling apparatus 200, 300 receives a plurality of banknotes, recognizes and counts the banknotes, and generates cash data. For example, the cash handling apparatus 200, 300 performs a depositing process including: taking a plurality of banknotes placed in an inlet one by one into the apparatus; recognizing and counting the banknotes; and storing the banknotes for each denomination into a plurality of storage units disposed in the apparatus. For another example, the cash handling apparatus 200, 300 performs a dispensing process including: feeding out the stored banknotes from the storage units; recognizing and counting the banknotes; and discharging the banknotes from an outlet. The cash handling apparatus 200, 300 may be provided with a banknote storage container detachably attached thereto. In this case, banknotes fed out one by one from the attached storage container can be deposited in the apparatus by the depositing process. In the dispensing process, banknotes fed out from the storage units can be stored in the storage container. The cash handling apparatus 200, 300 may be able to handle coins in addition to banknotes. Since the configuration and operation of an apparatus for depositing and dispensing banknotes and coins have conventionally been known, detailed description thereof is omitted. As described by referring to FIG. 1, banknotes having been handled by the cash handling apparatus 300 and being under the management of the central bank 11 are strictly managed such that no one can touch them, or only a person having a predetermined authority can touch them.

As shown in FIG. 3, the cash handling apparatus 200 in the transfer source 20 recognizes a currency, denomination, authenticity, and fitness of each of the banknotes to be transferred, to generate cash data (step S101). The cash data generated in each of the plurality of transfer sources 20 is transmitted to the management apparatus 100 to be managed in the management apparatus 100 (step S102). The banknotes, whose cash data have been generated, are transported from the transfer source 20 to the transfer destination 30 (step S103). In the transfer destination 30, the cash handling apparatus 300 recognizes a currency, denomination, authenticity, and fitness of each of the banknotes transported from the transfer source 20, to generate cash data (step S104).

The cash handling apparatus 200, 300 has attribute information including: apparatus information for specifying each apparatus; and positional information for specifying the installation place of each apparatus. In cash handling, the cash handling apparatus 200, 300 obtains a captured image of each banknote, and recognition information including a recognition result of each banknote and a recognition cause that the recognition result is obtained. The cash data, in which the cash handling apparatus 200, 300 has registered therein data of each banknote, includes the attribute information for specifying the apparatus and the installation place, and the banknote information obtained through the cash handling.

FIG. 4 shows an example of cash data. As shown in FIG. 4, information on each of banknotes handled by the cash handling apparatus 200, 300 is registered in the cash data. For example, the cash data includes "currency", "denomination", "serial number", "recognition information", "image", "handling number", "handling date and time", "positional information", "branch information", and "apparatus information" as shown in FIG. 4. However, FIG. 4 is merely an example. The cash data may not necessarily include some of the information items shown in FIG. 4, or may include information other than the information items shown in FIG. 4. For example, the cash data may not include the item "currency", and information indicating currency and denomination may be registered under the item "denomination". The cash data may not necessarily include the item "handling number".

The currency, denomination, serial number, recognition information, and image are included in the banknote information obtained by the cash handling apparatus 200, 300 from each banknote through the banknote handling. Meanwhile, the handling number, handling date and time, positional information, branch information, and apparatus information are included in the attribute information. A process of determining matching between the data registered in the cash data of the transfer source 20 and the data registered in the cash data of the transfer destination 30 is performed based on the banknote information. A process of specifying the transfer source 20 and the transfer destination 30 of each banknote is performed based on the attribute information.

A currency and a denomination of the cash data are obtained through a recognition process of a banknote performed by the cash handling apparatus 200, 300. In the recognition process, the cash handling apparatus 200, 300 recognizes the kind of the banknote, based on optical characteristics, magnetic characteristics, thickness, etc., of the banknote. The recognition process includes: a process of recognizing the currency and denomination of a banknote; a process of recognizing the authenticity of a banknote; and a process of recognizing the fitness, i.e., the degree of damage, of a banknote.

A serial number of the cash data is obtained through a character recognition process performed on a serial number portion in an image obtained by capturing a banknote by the cash handling apparatus 200, 300. If a character recognition result cannot be obtained for a certain digit of the serial number consisting of a plurality of digits, information in which a predetermined character such as a question mark or an exclamation mark is assigned to this digit is registered as a serial number in the cash data. When comparing serial numbers, as for the unreadable digit to which the predetermined character is assigned, this digit is determined not to match any character used for this digit. Alternatively, this digit to which the predetermined character is assigned may be determined to match all characters used for this digit. If a character recognition result of a serial number cannot be obtained, cash data including "unreadable" under the item "serial number" may be generated.

Recognition information of the cash data is obtained through a recognition process performed for a banknote by the cash handling apparatus 200, 300. The recognition information includes a recognition result, and a recognition cause for the recognition result. For example, when recognizing fitness of a banknote, if the banknote is recognized as an unfit note due to stain on the surface of the banknote, the recognition information includes: information indicating that the banknote is an unfit note; and information indicating that the banknote is recognized as an unfit note due to the stain. If a banknote is recognized as an unfit note due to wrinkle, the recognition information includes: information indicating that the banknote is an unfit note; and information indicating that the banknote is recognized as an unfit note due to the wrinkle. If a banknote has a plurality of causes for being recognized as an unfit note, recognition information of this banknote includes the plurality of causes.

An image of the cash data is obtained by capturing a banknote by the cash handling apparatus 200, 300. For example, inside the cash handling apparatus 200, 300, sensors opposing each other are disposed across a banknote transportation path, and the sensors capture an image of a banknote being transported along the transportation path, thereby obtaining an image of the entire banknote surface of both the face side and the back side. The image to be registered in the cash data is not limited to the image of the entire surfaces of banknote, and may be a partial image obtained by capturing a part of the banknote. The image of the cash data is not limited to the image including both faces of the banknote, and may be an image of either face.

A handling number of the cash data is an identification number that is assigned to each handling when the cash handling apparatus 200, 300 handles banknotes to be transferred. If plural times of cash handling are performed by the same cash handling apparatus 200 (300), the respective times of cash handling can be distinguished from each other based on the handling numbers. Handling date and time of the cash data indicates when the cash handling apparatus 200, 300 performed the banknote handling.

Positional information of the cash data indicates the installation place of the cash handling apparatus 200, 300. As the positional information, information indicating geographic coordinates of the installation place, such as a latitude and a longitude or a predetermined code indicating a position on a map, can be used. For example, the positional information is stored in the cash handling apparatus 200, 300 in advance, whereby the cash handling apparatus 200, 300 generates cash data including the positional information. The cash handling apparatus 200, 300 may be communicably connected to a mobile terminal such as a smartphone having a function of specifying the present position, and may use the positional information obtained from the mobile terminal. The cash handling apparatus 200, 300 may have a function of specifying the present position, and use the specified positional information. Since the method for specifying the present position has conventionally been known, detailed description thereof is omitted. For example, the present position is specified by using global positioning satellite information or network information.

Branch information of the cash data indicates a branch (store) where the cash handling apparatus 200, 300 is installed. The content of the branch information is not particularly limited as long as the branch where the cash handling apparatus 200, 300 is installed can be specified based on the branch information. For example, if the cash handling apparatus 200 is installed in one of a plurality of branches of the commercial bank 12, a combination of information indicating the bank name of the commercial bank 12 and information indicating the branch name may be used as the branch information. If the installation place of the cash management facility 13 can be specified from the name of the cash management facility 13, information indicating the name of the cash management facility 13 may be used as the branch information. Since both the positional information and the branch information indicate the installation place of the cash handling apparatus 200, 300, one of the positional information and the branch information may be registered in the cash data, or the positional information and the branch information may be integrated into one piece of information.

Apparatus information of the cash data indicates each cash handling apparatus 200, 300. The content of the apparatus information is not particularly limited as long as the cash handling apparatus 200, 300 can be specified based on the apparatus information. For example, a combination of information indicating the model number of the cash handling apparatus 200, 300 and information indicating the product serial number of the apparatus may be used as the apparatus information.

The management apparatus 100 specifies the transfer source 20 of banknotes, based on the cash data received from each transfer source 20 and the cash data received from the transfer destination 30 (step S105 in FIG. 3). FIG. 5 is a flowchart illustrating a process of specifying the transfer source 20 of banknotes by the management apparatus 100, based on the cash data.

Upon receiving the cash data generated by the cash handling apparatus 300 in the transfer destination 30, the management apparatus 100 compares the serial numbers included in the received cash data with the serial numbers included in the cash data received from the cash handling apparatus 200 of each transfer source 20 (step S201). As for the cash data of the transfer source 20 to be compared, all the cash data received within a predetermined period before the time point when the cash data was received from the cash handling apparatus 300, may be set as a comparison target, or the comparison target may be narrowed down in advance through setting. In the case of narrowing down the comparison target, the cash data of a transfer source 20, whose number of data matches the number of data included in the cash data of the transfer destination 30, is set as the comparison target, for example. That is, a transfer source 20 having handled the same number of banknotes as the number of banknotes handled in the transfer destination 30, is subjected to the respective processes for determining the transfer source.

If a serial number included in the cash data received from the cash handling apparatus 300 is found in the cash data already received from any of the cash handling apparatuses 200, the management apparatus 100 determines that there is a banknote transfer source 20 (step S202; Yes). That is, the management apparatus 100 determines that the cash data received from the cash handling apparatus 300 is generated in the transfer destination 30 from banknotes transported from a transfer source and the transfer source 20 was specified. For example, if the same serial number as the serial number obtained in the cash handling apparatus 300 is found from the cash data of a transfer source A, among the cash data already received from a plurality of transfer sources A, B, . . . , the management apparatus 100 determines the transfer source A as the transfer source 20 of the banknotes handled in the transfer destination 30.

If a serial number included in the cash data received from the cash handling apparatus 300 is not found in the cash data already received from the cash handling apparatuses 200 (step S202; No), the management apparatus 100 compares information, other than the serial number, included in the cash data (step S203).

Specifically, the management apparatus 100 compares at least one of the recognition information and the image, among the information items included in the cash data shown in FIG. 4, between the cash data already received from each cash handling apparatus 200 and the cash data just received from the cash handling apparatus 300. For example, a process of comparing at least one of the recognition information and the image is performed for data of banknotes whose serial numbers do not match but whose currencies and denominations match, among the plurality of data registered in the cash data.

If banknotes, whose serial numbers do not match but whose images match, are found between the cash data of the transfer destination 30 and the cash data of the transfer source 20 (step S204; Yes), the management apparatus 100 determines the transfer source 20, based on the images.

For example, if the image obtained by the cash handling apparatus 300 in the transfer destination 30 matches the image in the cash data of the transfer source A among the plurality of transfer sources A, B, . . . , the management apparatus 100 determines the transfer source A as the banknote transfer source 20. Since the method of comparing images to determine whether there is a match has conventionally been known, detailed description thereof is omitted. For example, an evaluation value indicating a similarity of the images may be calculated by using a predetermined image comparison technology, and matching of the images may be determined when the evaluation value exceeds a predetermined threshold value.

If banknotes, whose serial numbers do not match but whose recognition information matches, are found between the cash data of the transfer destination 30 and the cash data of the transfer source 20, the management apparatus 100 determines the transfer source 20, based on the recognition information.

If recognition information includes a plurality of recognition causes, the method of determining whether there is a match in recognition information may be changed through setting. For example, it may be determined that there is a match in recognition information when the recognition causes obtained in the transfer destination 30 completely match the recognition causes obtained in the transfer source 20. With this setting, for example, it is determined that data of a banknote recognized as an unfit note due to wrinkle and stain in the transfer destination 30 does not match data of a banknote recognized as an unfit note due to only wrinkle in the transfer source 20. Alternatively, for example, it may be determined that there is a match in recognition information when all the recognition causes obtained in the transfer source 20 are included in the recognition causes obtained in the transfer destination 30. With this setting, it is determined that data of a banknote recognized as an unfit note due to wrinkle and stain in the transfer destination 30 matches data of a banknote recognized as an unfit note due to wrinkle in the transfer source 20. Thus, for example, even if a banknote gets a new stain after the banknote has been handled in the transfer source 20 and before it is handled in the transfer destination 30, it can be determined that the data of this bank obtained in the transfer source 20 matches the data of this banknote obtained in the transfer destination 30.

For example, if the recognition information obtained by the cash handling apparatus 300 in the transfer destination 30 matches the recognition information of the transfer source A among the plurality of transfer sources A, B, . . . , the management apparatus 100 selects the transfer source A as a candidate for the banknote transfer source 20. As for recognition information, there is a possibility that a plurality of banknotes have the same recognition result and the same recognition cause. Therefore, even when there is a match in recognition information, the management apparatus 100 just selects the corresponding transfer source as a candidate for the transfer source 20, and continues searching for banknotes having a match in recognition information. If the transfer source A becomes the only one candidate for the transfer source 20 selected based on the recognition information, the management apparatus 100 determines that the transfer source 20 can be specified (step S204), and determines the transfer source A as the banknote transfer source 20.

Meanwhile, when there are a plurality of candidates for the transfer source 20, the management apparatus 100 determines that the transfer source 20 cannot be specified (step S204; No). In this case, an operation of specifying the banknote transfer source 20 is performed by using a terminal apparatus that is placed in the transfer destination 30 and is communicable with the management apparatus 100. The terminal apparatus used for the operation and an operator of this terminal apparatus are not particularly limited. For example, the operation may be performed by using the management apparatus 100. However, hereinafter, the description will be continued for the case where an operator who operates the cash handling apparatus 300 in the transfer destination 30 performs the operation for specifying the banknote transfer source 20 by using the operation unit and the display unit included in the cash handling apparatus 300.

The management apparatus 100 displays a screen for specifying the banknote transfer source 20, on the display unit of the cash handling apparatus 300 (step S205). FIG. 6 shows an example of the screen displayed when the operator needs to specify the banknote transfer source 20. As for a banknote whose transfer source 20 cannot be specified from its serial number, information on this banknote registered in the cash data of the transfer destination 30 is displayed on the screen. In the example shown in FIG. 6, an image, currency, denomination, serial number, and recognition information, of the banknote whose transfer source is unknown, are displayed at the top of the screen. In the example, the recognition information includes a recognition result indicating that the banknote is an unfit note, and a recognition cause indicating that the banknote is recognized as an unfit note due to a crease on the right side.

In addition to the banknote whose transfer source is unknown, pieces of information on banknotes that the management apparatus 100 has selected as candidates for the transfer source 20 are listed on the screen of the display unit. FIG. 6 shows the example that there are two banknotes each recognized as an unfit note due to a crease on the right side, i.e., one banknote handled in the transfer source A and another banknote handled in the transfer source B. Since the management apparatus 100 cannot specify one transfer source 20, the pieces of information on these two banknotes are listed on the screen.

As shown in FIG. 6, pieces of information registered in the cash data are displayed for each banknote selected as a candidate when specifying the transfer source. By visually confirming the displayed content, the operator can specify which of the transfer source A and the transfer source B is the transfer source 20 of the banknote whose transfer source is unknown. For example, the operator specifies the transfer source 20 by visually comparing the images of the banknotes and the serial numbers included in the images.

For example, there is a case where a crease, wrinkle, or stain, which is newly applied to a banknote after generation of cash data in the transfer source A and before generation of cash data in the transfer destination 30, may cause a mismatch in banknote images or prevent the serial number from being accurately read. For another example, there is a case where differences in function and performance between the cash handling apparatus 200 and the cash handling apparatus 300 may cause generation of cash data having a mismatch in images or serial numbers.

In the example shown in FIG. 6, since a new crease is applied to a banknote having been handled in the transfer source 20, it was determined that an image obtained in the transfer source 20 may not match an image obtained in the transfer destination 30. Even in such a case, as shown in FIG. 6, the management apparatus 100 displays, on the screen, a list of pieces of information on banknotes as candidates for the transfer source 20, so that the operator can easily specify the banknote transfer source 20.

On the screen of the display unit, check boxes corresponding to the respective listed banknotes are displayed. The operator, who has confirmed that the banknote transfer source 20 is the transfer source A, checks the check box for the transfer source A as shown in FIG. 6 and presses an OK button on the screen of the operation unit. The management apparatus 100 receives the selection result on the transfer source 20 by the operator (FIG. 5, step S206).

The management apparatus 100 performs a process of specifying the transfer source 20 with respect to the data of each banknote included in the cash data generated by the cash handling apparatus 300 in the transfer destination 30. If there remain data of banknotes having not yet been handled (step S207; No), the management apparatus 100 returns to step S201 and starts the processes for data of the next banknote. Upon completing data handling for all the data of banknotes (step S207; Yes), the management apparatus 100 ends the data handling.

As described above, the management apparatus 100 automatically specifies the transfer source 20 of the banknotes handled by the cash handling apparatus 300 in the transfer destination 30, based on the cash data received from each cash handling apparatus 200 in the transfer source 20 and on the cash data received from the cash handling apparatus 300 in the transfer destination 30.

When the banknote transfer source 20 has been specified, the management apparatus 100 performs a process that is set in advance with respect to the specified transfer source 20 and the transfer destination 30 (FIG. 3, step S106). For example, the management apparatus 100 transmits loading information to a predetermined transmission destination. For another example, the management apparatus 100 performs an account process of transferring the amount of banknotes transported from the transfer source 20 to the transfer destination 30, from the account of the transfer source 20 to the account of the transfer destination 30. Specifically, the management apparatus 100 transmits, to a predetermined external apparatus, information indicating the account of the transfer source 20, information indicating the account of the transfer destination 30, and the amount to be transferred between the set accounts, and instructs the external apparatus to perform the account process, whereby the external apparatus performs the account process.

The content of the data comparison process in step S203 shown in FIG. 5, i.e., the process of specifying the banknote transfer source 20 based on the information other than the serial numbers, can be changed through setting. FIG. 7 illustrates setting regarding a method for specifying a banknote transfer source by the management apparatus 100. The comparison process in step S203 shown in FIG. 5 is performed based on the setting as described below.

FIG. 7 shows a comparison result obtained when data of banknotes P, Q, R, S, T, . . . registered in the cash data generated by the cash handling apparatus 300 in the transfer destination 30, are compared with data registered in the cash data of the transfer source A, and a determination result of the transfer source 20 based on the comparison result. In FIG. 7, "match" indicates that the data match, and the mark "x" indicates that the data do not match.

For example, as for the banknote P, all the currency, denomination, serial number, recognition information, and image obtained in the cash handling apparatus 300 in the transfer destination 30 match the data registered in the cash data of the transfer source A. In this case, by only performing determination based on the serial number, the transfer source 20 of the banknote P is specified to be the transfer source A, as shown under the item "determination result" in FIG. 7.

When comparing the data registered in the cash data of each transfer source 20 with the data registered in the cash data of the transfer destination 30, the management apparatus 100 may be set so as to determine that both the data match as long as there are matches in both the recognition information and the image even if there is no match in the serial number. In this case, in the comparison process in step S203 shown in FIG. 5, among the banknotes Q to T which do not match in serial number as indicated by "x" under the item "serial number" in FIG. 7, data of the banknote Q of the transport destination 30 is determined to match the data of the transfer source A. Meanwhile, data of the banknotes R to T of the transfer destination 30, which do not match in at least one of the recognition information and the image with the data of the transfer source A, are determined not to match the data of the transfer source A. If other data that matches the data of the banknote Q is not found in the cash data of the other transfer sources 20, the transfer source 20 of the banknote Q is specified to be the transfer source A. If such other data is found, the transfer source 20 is specified by the operator of the cash handling apparatus 300 as explained by referring to FIG. 6.

If the management apparatus 100 is set so as to determine that both the data match as long as there is a match in the recognition information even if there is no match in the serial number, data of the banknotes Q and R, among the banknotes Q to T of the transfer destination 30, are determined to match the data of the transfer source A. Meanwhile, data of the banknotes S and T are determined not to match the data of the transfer source A because there is no match in the recognition information.

If the management apparatus 100 is set so as to determine that both the data match as long as there is a match in the image even if there is no match in the serial number, data of the banknotes Q and S, among the banknotes Q to T of the transfer destination 30, are determined to match the data of the transfer source A. Meanwhile, data of the banknotes R and T are determined not to match the data of the transfer source A because there is no match in the image.

If the management apparatus 100 is set so as to determine that both the data match as long as there is a match in at least one of the recognition information and the image even if there is no match in the serial number, data of the banknotes Q to S, among the banknotes Q to T of the transfer destination 30, are determined to match the data of the transfer source A. Meanwhile, data of the banknote T is determined not to match the data of the transfer source A because there is no match in both the recognition information and the image.

As described above, when comparing the data of each banknote registered in the cash data of the transfer source 20 and the data of each banknote registered in the cash data of the transfer destination 30, it can be set that both the data are determined to match as long as there is a match in at least one of the recognition information and the image even if there is no match in the serial number. Thus, management of banknotes can be performed without depending on only the reading result of the serial numbers.

The management apparatus 100 is not limited to perform only one of the matching determination processes including: the process of determining a match in the recognition information; the process of determining a match in the image; the process of determining a match in both the recognition information and the image; and the process of determining a match in the recognition information or the image. The matching determination processes may be given priority levels, and when the transfer source 20 is not specified, the management apparatus 100 may perform the matching one or more determination processes based on the priority levels as follows.

For example, if the processing load of the matching determination process based on the image is high, the matching determination process based on the recognition information is preferentially performed, and only when the transfer source 20 cannot be specified based on the recognition information, the matching determination process based on the image may be performed. For example, if the number of data including the same recognition information is large and therefore the number of candidates for the transfer source 20 is too large in the matching determination process based on the recognition information, the matching determination process based on the image is preferentially performed, and only when the transfer source 20 cannot be specified based on the image, the matching determination process based on the recognition information may be performed.

In the present embodiment, the process of determining the transfer source 20 is performed with respect to the data of banknotes included in the cash data generated in the transfer destination 30. However, determination of the transfer source 20 may be performed based on a part of the data of banknotes. For example, when the same transfer source 20 has been specified with respect to a predetermined number of data after starting the comparison of the data included in the cash data of the transfer destination 30, the transfer source 20 may be determine without handling the remaining data. Specifically, for example, even when data of 100 banknotes are included in the cash data of the transfer destination 30, if the transfer source 20 of the banknotes can be specified to be the transfer source A with respect to data of a preset number of (e.g., 10) banknotes, the management apparatus 100 may determine the transfer source 20 to be the transfer source A without performing the comparison for specifying the transfer source 20 for the data of the remaining 90 banknotes.

In the present embodiment, the banknote transfer source 20 is specified by comparing the serial numbers, and if the transfer source 20 cannot be specified based on the serial numbers, the transfer source 20 is specified based on information other than the serial numbers. However, even when the transfer source 20 has been specified based on the serial numbers, the process of specifying the transfer source 20 based on information other than the serial numbers may be performed.

For example, even when the transfer source 20 has been specified to be the transfer source A because the serial number of a banknote obtained in the transfer destination 30 matches the serial number of a banknote obtained in the transfer source A, the management apparatus 100 may perform the process of specifying the transfer source 20 based on the recognition information, images, etc., of banknotes If the transfer source 20 specified based on the serial numbers does not match the transfer source 20 specified based on the other information, the data for comparison may be presented to the operator as shown in FIG. 6 so that the operator can determine the transfer source 20. Even when the serial numbers obtained in the transfer source 20 match the serial numbers obtained in the transfer destination 30, the matching determination process based on the recognition information, images, etc., being further performed realizes more reliable specification of the transfer source 20.

In the present embodiment, transfer of banknotes is specified based on that a serial number obtained in the transfer destination 30 matches a serial number obtained in the transfer source 20. However, transfer of banknotes may be specified by other methods.

For example, in the example shown in FIG. 1, the management apparatus 100 makes a serial number list of the serial numbers of banknotes obtained through handling in the cash handling apparatus 300 when the banknotes are unloaded to the commercial bank 12, and stores the serial number list corresponding to the commercial bank 12 therein. The commercial bank 12 does business by using the unloaded banknotes, and after the business hours, loads the remaining banknotes into the cash handling apparatus 300. Upon receiving the cash data of the loaded banknotes from the cash handling apparatus 300, the management apparatus 100 compares the serial numbers included in the cash data with the serial numbers in the serial number lists of the commercial banks. The management apparatus 100 finds the same serial numbers in the serial number list of the commercial bank 12 and recognizes the banknotes are loaded from the commercial bank 12 based on the comparison result, and handles the loaded banknotes as described above.

For example, in the example shown in FIG. 2, when banknotes are unloaded from the central bank 11 to the commercial bank 12, the management apparatus 100 makes a serial number list of the serial numbers of banknotes obtained through handling in the cash handling apparatus 300 of the cash management facility 13, and stores the serial number list corresponding to the commercial bank 12 therein. The commercial bank 12 does business by using the unloaded banknotes, and after the business hours, loads the remaining banknotes in the cash management facility 13. Upon receiving the cash data of the loaded banknotes from the cash handling apparatus 300 of the cash management facility 13, the management apparatus 100 compares the serial numbers included in the cash data with the serial numbers in the serial number list. The management apparatus 100 specifies the transfer source 20 of the loaded banknotes to be the commercial bank 12, and handles the loaded banknotes as described above.

In the above embodiment, actual banknotes to be transferred are a handling target, but the cash handling system 1 may perform handling of digital currency. For example, in the example shown in FIG. 1 and FIG. 2, it is assumed that the central bank 11 issues digital currency, and transaction using the digital currency is conducted in the market. When transmitting a loading notification to the central bank 11, the commercial bank 12 requests the central bank 11 to convert the banknotes to be loaded into digital currency. Thereafter, the banknotes are loaded and the loading information is transmitted from the management apparatus 100 to the central bank 11 as described above. Based on the loading information, the central bank 11 confirms the amount of the banknotes loaded from the commercial bank 12, and issues, for the commercial bank 12, digital currency equivalent to the amount of the loaded banknotes. Thus, the commercial bank 12 can use the digital currency into which the banknotes loaded in the cash management facility 13 have been converted.

The central bank 11 may issue the digital currency for the commercial bank 12 at a timing before transmission of the loading information from the management apparatus 100 to the central bank 11. The digital currency issuance timing is not particularly limited. For example, at a timing when the cash data is transmitted from the commercial bank 12 to the management apparatus 100, the central bank 11 may issue, for the commercial bank 12, digital currency equivalent to the amount of the banknotes whose data are stored in the cash data. In the example shown in FIG. 2, the digital currency is issued while the banknotes are not loaded from the commercial bank 12 into the cash management facility 13. However, with the issuance of the digital currency, the banknotes having the serial numbers included in the cash data may be regarded and handled as having no banknote values. For example, the central bank 11 notifies the commercial banks of the serial numbers of the invalidated banknotes to make the banknotes unusable in the market. In addition, for example, the management apparatus 100 may transmit the serial numbers of the invalidated banknotes to the cash handling apparatuses 200, 300. Then, the cash handling apparatuses 200, 300 may regard these banknotes as invalid, and may reject the banknotes without adding the amount of the banknotes to the amount at the time of cash handling. The invalid banknotes may be loaded in the cash management facility 13 as described above, or may be discarded in the commercial bank 12 or a dedicated facility.

In the present embodiment, the above processes have been described for examples of financial facilities. However, the user of the cash handling system 1 is not limited to financial facilities. For example, when proceeds from sales are transferred from a plurality of commercial stores such as retail stores that perform commodity transactions with customers, to a predetermined base called a cash center, processes regarding the proceeds from sales can be performed as described above. Also, when banknotes are transferred between a commercial store and a commercial bank 12, between a commercial store and a CIT company, or between a commercial bank 12 and a CIT company, processes regarding cash can be performed as described above. As for commercial stores, the above processes may be performed not only for cash handling apparatuses installed in the commercial stores but also for cash handling apparatuses, etc., that are installed in a shopping mall, etc., and are used by a plurality of commercial stores.

In the present embodiment, banknotes are physically transferred by being transported by the CIT company. However, the banknote transport method is not particularly limited. For example, an automatic machine may interconnect bases or apparatuses, and banknotes may be transported by the automatic machine. In the example shown in FIG. 2, an automatic machine may interconnect the cash handling apparatus 200 and the cash handling apparatus 300, and at least one of loading and unloading may be performed via the automatic machine. Also, in the example shown in FIG. 1, for example, an automatic machine may interconnect the cash handling apparatus 300 and another cash handling apparatus, and at least one of loading and unloading may be performed between the cash handling apparatus 300 and the other cash handling apparatus via the automatic machine. For another example, if a belt conveyer type automatic machine interconnects the apparatuses, transport of banknotes at loading and at unloading can be automated by using the belt conveyer type automatic machine. The type of the automatic machine is not particularly limited. For example, an unmanned machine, such as an unmanned ground vehicle or an unmanned aerial vehicle such as a drone, may transport banknotes. An unmanned machine being remotely controlled may transport banknotes, or an autonomous unmanned machine may transport banknotes.

In the present embodiment, the cash handling system 1 includes the management apparatus 100 and the cash handling apparatuses 200, 300. However, this configuration is functionally schematic, and the configuration of the cash handling system 1 is not physically limited to this configuration. The management apparatus 100 may realize some of the functions and operations of the cash handling apparatuses 200, 300. For example, the management apparatus 100 may generate cash data. The cash handling apparatuses 200, 300 may realize some of the functions and operations of the management apparatus 100. For example, the cash handling apparatus 300 in the transfer destination 30 may obtain cash data of the cash handling apparatus 200 in the transfer source 20 to perform a process of determining whether data match. Alternatively, some of the functions and operations of the cash handling apparatuses 200, 300 may be performed by another terminal apparatus connected to the cash handling apparatuses 200, 300. The cash handling system 1 may be a distributed type system in which a plurality of management apparatuses 100 perform processes in cooperation with each other. The distributed or integrated forms of each apparatus are not limited to the forms described above, and all or some of the forms may be distributed or integrated functionally or physically in any unit depending on various loads, use statuses, or the like.

A cash handling system according to the present disclosure includes: a cash handling apparatus configured to handle banknotes whose ownership is to be transferred between a first owner and a second owner, and generate cash data including serial numbers of the banknotes and attribute information regarding whereabouts of the banknotes; and a management apparatus configured to obtain the cash data from the cash handling apparatus, and perform a process of transferring the ownership of the banknotes from the first owner to the second owner on condition that the attribute information satisfies a condition that allows the second owner to own the banknotes.

In the above configuration, the cash handling apparatus may generate the cash data by handling the banknotes whose ownership is transferred between a commercial bank and a central bank. If the attribute information indicates that the banknotes are present in a place where cash owned by the central bank is managed, the management apparatus may perform a process of transferring the ownership of the banknotes from the commercial bank to the central bank.

In the above configuration, the attribute information may include positional information indicating geographic coordinates of a base where the cash handling apparatus is installed.

In the above configuration, the cash handling apparatus may obtain the positional information from a mobile terminal having a function of specifying a present position.

In the above configuration, the attribute information may include apparatus information indicating the cash handling apparatus.

In the above configuration, each of cash handling apparatuses installed in a plurality of bases may generate the cash data. The management apparatus may obtain the cash data from each cash handling apparatus, specify a first owner that is a transfer source of the ownership of the banknotes and a second owner that is a transfer destination of the ownership, based on attribute information included in each cash data, and on data that is prepared in advance and indicates correspondence between each attribute information and information on the owners. The management apparatus may further perform a process of transferring the ownership of the banknotes from the first owner to the second owner.

In the above configuration, based on the cash data generated in the cash handling apparatuses of a plurality of commercial banks, and on the cash data generated in the cash handling apparatus of a cash management facility that manages cash owned by a central bank, the management apparatus may specify a commercial bank that is a transfer source of the ownership of banknotes handled in the cash management facility, and perform a process of transferring the ownership of the banknotes from the commercial bank to the central bank.

In the above configuration, the management apparatus may have stored therein correspondence data in which serial numbers of banknotes, whose ownership has been transferred from the central bank to each commercial bank, is associated with information indicating the commercial bank. The cash handling apparatus in the cash management facility may handle banknotes whose ownership is transferred to the central bank and generate the cash data including serial numbers of the banknotes. If the cash data includes a serial number that is included in the correspondence data, the management apparatus may specify a commercial bank associated with the serial number in the data, as a transfer source of the ownership of the banknotes.

In the above configuration, the cash handling apparatus may generate the cash data further including at least one of recognition information obtained by recognizing each banknote and an image obtained by capturing each banknote. If the cash data of the first owner includes a serial number that does not match serial numbers in the cash data of the second owner, the management apparatus may confirms, based on at least one of the recognition information and the image of the banknote having the mismatching serial number, matching between banknotes whose information is registered in the cash data of the transfer source and banknotes whose information is registered in the cash data of the transfer destination.

In the above configuration, the recognition information may include a recognition result of a banknote recognized by the cash handling apparatus, and a recognition cause indicating a cause for the recognition result.

In the above configuration, the management apparatus may perform an account process of transferring the amount of the banknotes from an account of a first owner that is a transfer source of the ownership of the banknotes to an account of a second owner that is a transfer destination of the ownership of the banknotes. For example, the management apparatus may be installed in the central bank, and may be configured to perform a credit operation including: obtaining cash data including serial numbers of banknotes handled by the cash handling apparatus; and performing an account process after confirming and approving the content of the cash data before the banknotes arrives at the central bank.

A cash handling system according to the present disclosure includes: a handling apparatus configured to handle cash in a store, and transmit first serial number information of the handled cash, and first attribute information related to the store; and a management apparatus configured to receive, from the handling apparatus, the first serial number information of the cash and the first attribute information related to the store. The management apparatus may have a data group including information on the store, associate the first serial number information of the cash and the first attribute information received from the handling apparatus, with the information on the store included in the data group. The management apparatus may further deposit, into a first account related to the store, the amount of the cash handled by the handling apparatus, if the first serial number information and the first attribute information satisfy a predetermined condition.

In the above configuration, the management apparatus may have an attribute information list in which a predetermined standard is described. If the attribute information transmitted from the handling apparatus satisfies the predetermined standard described in the attribute information list, the management apparatus may perform a control to transfer a corresponding amount of cash to a first account corresponding to the attribute information list.

A cash handling method according to the present disclosure includes: handling cash with a handling apparatus configured to handle cash, and transmitting first serial number information of the handled cash, and first attribute information related to the handling apparatus; receiving, from the handling apparatus, the first serial number information of the cash, and the first attribute information related to the handling apparatus; and associating, based on a data group including information on the handling apparatus, the first serial number information of the cash and the first attribute information received from the handling apparatus, with the information on the handling apparatus included in the data group. If the first serial number information and the first attribute information satisfy a predetermined condition, the cash handling method further includes depositing, into a first account, an amount of cash handled by the handling apparatus.

As described above, in the cash handling system, cash whose ownership is desired to be transferred is handled by the cash handling apparatus to generate cash data including information on the cash, and a process of transferring the ownership of the cash is automatically performed based on the cash data. Even when transporting actual cash, the cash is handled by the cash handling apparatus in the transfer source and by the cash handling apparatus in the transfer destination, whereby processes regarding the transport of the actual cash and the transfer of the ownership of the cash can be automatically performed. Since it is only required to handle the cash to be transferred with the cash handling apparatuses, the ownership of a huge amount of cash can be easily transferred.

As described above, the cash handling system and the cash handling method according to the present disclosure are useful in easily transferring the ownership of cash.

What is claimed is:

1. A cash handling system, comprising:
a cash handling apparatus configured to
handle banknotes whose ownership is to be transferred between a first owner and a second owner, and
generate cash data including serial numbers of the banknotes and attribute information including positional information of a location where the cash handling apparatus is installed; and
a management apparatus configured to
obtain the cash data from the cash handling apparatus, and
in a case that the attribute information satisfies a condition that allows the second owner to own the banknotes, perform a process of transferring the ownership of the banknotes from the first owner to the second owner.

2. The cash handling system according to claim 1, wherein
the cash handling apparatus generates the cash data by handling the banknotes whose ownership is transferred between a commercial bank and a central bank, and
in a case that the attribute information indicates that the banknotes are present in a place where cash owned by the central bank is managed, the management apparatus performs the process of transferring the ownership of the banknotes from the commercial bank to the central bank.

3. The cash handling system according to claim 1, wherein the positional information includes geographic coordinates of the location where the cash handling apparatus is installed.

4. The cash handling system according to claim 1, wherein the cash handling apparatus obtains the positional information from a mobile terminal specifying a present position.

5. The cash handling system according to claim 1, wherein the attribute information includes apparatus information indicating the cash handling apparatus.

6. The cash handling system according to claim 1, wherein
the cash handling apparatus is one cash handling apparatus of a plurality of cash handling apparatuses,
the plurality of cash handling apparatuses are installed in a plurality of bases and generates the cash data, and
the management apparatus is further configured to
obtain the cash data from the plurality of cash handling apparatuses,
specify the first owner that is a transfer source of the ownership of the banknotes and the second owner that is a transfer destination of the ownership, based on attribute information included in each cash data, and on data that is prepared in advance and indicates correspondence between each attribute information and information on the first and second owners, and
perform the process of transferring the ownership of the banknotes from the first owner to the second owner.

7. The cash handling system according to claim 6, wherein
the plurality of cash handling apparatuses are of a plurality of commercial banks, and
based on the cash data generated by the plurality of cash handling apparatuses and on the cash data generated in the cash handling apparatus of a cash management facility that manages cash owned by a central bank, the management apparatus is configured to specify a commercial bank that is a transfer source of the ownership of banknotes handled in the cash management facility, and perform the process of transferring the ownership of the banknotes from the commercial bank to the central bank.

8. The cash handling system according to claim 7, wherein the management apparatus is configured to store correspondence data in which serial numbers of banknotes, whose ownership has been transferred from the central bank to each commercial bank, are associated with information indicating each commercial bank, the cash handling apparatus in the cash management facility is configured to handle banknotes whose ownership is transferred to the central bank, and generate the cash data including serial numbers of the banknotes, and in a case that the cash data includes a serial number that is included in the correspondence data, the management apparatus is configured to specify a commercial bank associated with the serial number in the correspondence data, as a transfer source of the ownership of the banknotes.

9. The cash handling system according to claim 6, wherein the cash data further includes at least one of recognition information obtained by recognizing each banknote and an image obtained by capturing each banknote, and in a case that the cash data of the first owner includes a serial number that does not match serial numbers in the cash data of the second owner, the management apparatus confirms, based on at least one of the recognition information and the image of the banknote having the mismatching serial number, matching between banknotes whose information is registered in the cash data of the transfer source and banknotes whose information is registered in the cash data of the transfer destination.

10. The cash handling system according to claim 9, wherein the recognition information includes a recognition result of a banknote recognized by the cash handling apparatus, and a recognition cause indicating a cause for the recognition result.

11. The cash handling system according to claim 1, wherein the management apparatus performs an account process of transferring the amount of the banknotes from an account of the first owner that is a transfer source of the ownership of the banknotes to an account of the second owner that is a transfer destination of the ownership of the banknotes.

12. A cash handling system, comprising:

a handling apparatus configured to handle cash in a store, and transmit cash data including first serial number information of the handled cash, and first attribute information related to positional information of a location where the handling apparatus is installed; and a management apparatus configured to receive the cash data from the handling apparatus, associate the first serial number information and the first attribute information with information on the store included in a data group of the management apparatus, and deposit, into a first account related to the store, an amount of the cash handled by the handling apparatus in a case that the first serial number information and the first attribute information satisfy a predetermined condition.

13. The cash handling system according to claim 12, wherein the management apparatus has an attribute information list including a predetermined standard, and in a case that the attribute information transmitted from the handling apparatus satisfies the predetermined standard in the attribute information list, the management apparatus is configured to perform a control process to transfer a corresponding amount of cash to an account corresponding to the attribute information list.

14. A cash handling method, comprising:

handling cash with a handling apparatus in a store;

transmitting, by the handling apparatus, cash data including first serial number information of the handled cash, and first attribute information related to positional information of a location where the handling apparatus is installed;

receiving, by a management apparatus, the cash data from the handling apparatus;

associating the first serial number information and the first attribute information with information on the store included in a data group of the management apparatus; and depositing into a first account, in a case where the first serial number information and the first attribute information satisfy a predetermined condition, an amount of cash handled by the handling apparatus.

* * * * *